Sept. 2, 1947.  R. L. JOHNSON ET AL  2,426,881
ROD HOLDER
Filed Dec. 3, 1945
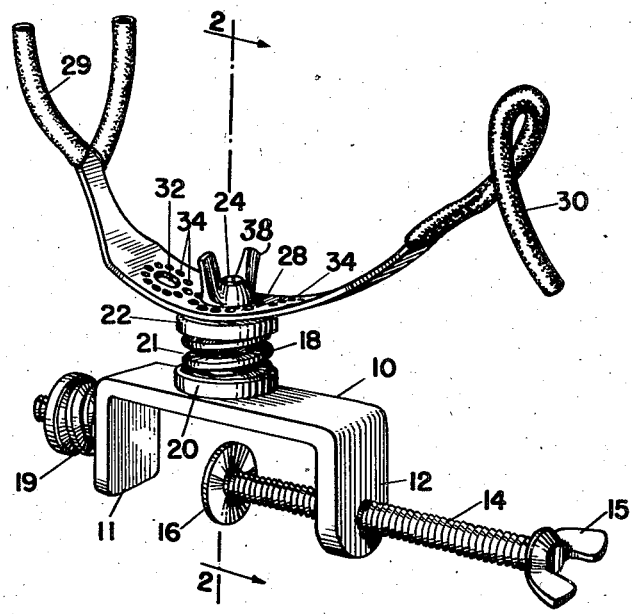
FIG_1
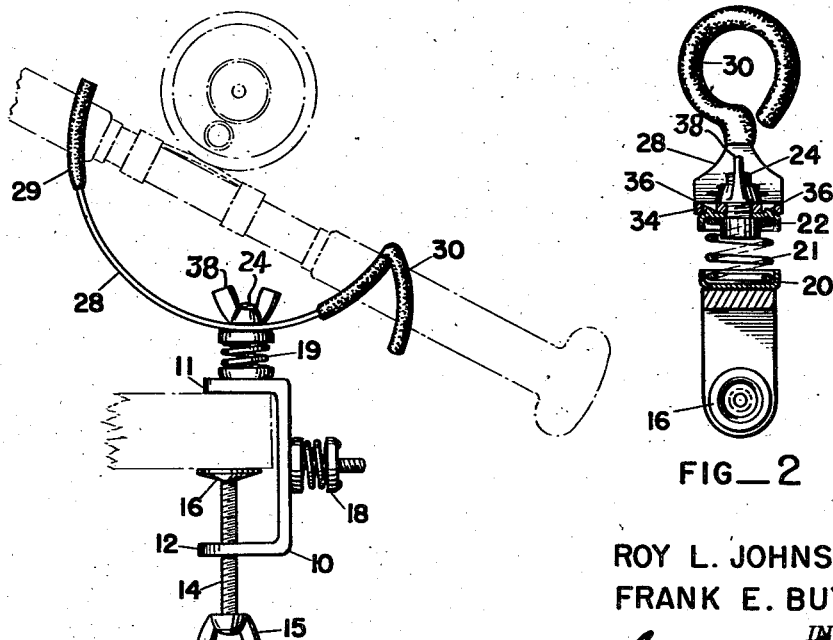
FIG_2
FIG_3
ROY L. JOHNSON &
FRANK E. BUYKEN
INVENTORS
BY
ATTORNEYS Patented Sept. 2, 1947

2,426,881

UNITED STATES PATENT OFFICE 2,426,881

ROD HOLDER

Roy L. Johnson and Frank E. Buyken, Seattle, Wash.; said Buyken assignor to said Johnson Application December 3, 1945, Serial No. 632,461

4 Claims. (Cl. 248—42)

This invention relates to improvements in a rod holder for fishermen and, more particularly, to a clamping holder adapted to be secured to structural elements in boats and the like for resiliently supporting a fishing rod, flag staffs or similar elongated elements.

While in the past there have been rod holders, it has been our experience that such as have been developed so inflexibly held the rod that when the bait was struck by the fish undue stresses and strains were imposed upon the rod to its injury. Also when a fish strikes at a moving bait on the end of a line attached to a pole mounted in such an inflexible holder, the fish does not have time or the opportunity to fully mouth the bait and the hooks often are not set properly.

Having in mind the prior art, it is an object of our invention to provide a flexible rod holder that will preclude injury to the rod.

Another object is to provide, in a rod holder, flexibility that resides in the mounting of the holder to its support and eliminates such flexibility in the means grasping the rod.

A further object of our invention is the provision of a rod holder that is simple to construct of a minimum of easily formed and assembled parts and one which can be mounted by the most unskilled in various desirable adjustments as to position.

The foregoing objects and others ancillary thereto we prefer to accomplish as follows:

According to a preferred form of our invention, we provide a C-clamp adapted to be secured to a multiplicity of elements in either vertical or horizontal planes and upon which is flexibly mounted the means whereby the rod is grasped during use. On the C-clamp is securely positioned at right angles to each other, a pair of spring elements each having a screw stud surrounded by positioning pins. A curved bracket member, having a fork at one end and a hook on the other end, is adapted by suitable holes for mounting upon the stud. Each of the stud holes of the curved bracket member is surrounded by a plurality of holes to receive the positioning pins. With this arrangement, when the curved member is positioned and directed as desired and a nut on the stud is tightened, the holder is ready for use. Normally the handle end of the rod is engaged under the hook and the portion therefrom toward the tip lies in the fork. Such being the case, when a bait trolled from the rod is struck by a fish or otherwise, the pull on the fishline is transmitted to the rod tip which may be six to ten feet from the holder and, even though the rod flexes, its support also may swing upon the flexible mounting spring and both the holder and the rod are simply and properly protected against undue strains.

The novel features that we consider characteristic of our invention are set forth with particularity in the appended claims. The invention itself, however, both as to its organization and its method of operation, together with additional objects and advantages thereof, will best be understood from the following description of a specific embodiment when read in connection with the accompanying drawings, in which Figure 1 is a perspective view of a rod holder showing our invention;

Figure 2 is a vertical sectional view taken on line 2—2 of Figure 1; and

Figure 3 is a side elevational view showing the holder as it may appear in use.

A rod holder, to overcome the defects hereinbefore enumerated, must have at least two totally distinct characteristics; it must be capable of flexing easily in use but not closely attended by a fisherman; and it also must flexibly hold a rod without danger of injury to the rod or fear of improperly hooking a fish that might strike at bait trailed from the rod. Accordingly, a preferred embodiment of our invention, referring to the figures of the drawing, is constituted by the C-clamp on which is flexibly mounted the rod positioning and holding means. The clamp means comprises the C-shaped element 10, one leg 11 of which is a clamping jaw and other leg 12 of which is bored and threaded to receive the screw 14 having manually grasped turning-means or wings 15. Between the legs of the clamp is the foot plate 16 of the screw which moves toward and away from the leg 11.

The clamp 10 carries a pair of holder-mounts 18 and 19, each of which is alike but which are mounted at right angles to each other on the clamp. Each such mount includes a cup 20 that is secured to the clamp, a coil-spring 21 secured in the cup 20, an upper inverted cup 22 also secured to the spring and carrying the upstanding threaded stud 24. All of these members are adequately secured by ordinary welding practices in the proper positions shown.

A rod is held in a curved bracket member 28 having a rubber upholstered fork 29 at one end and the slightly spiral hook 30 at the other end. Member 28 has a plurality of holes 32 lengthwise of it and each such hole is surrounded by an annular series of smaller holes or perforations 34. The curved member is dropped over a stud 24 which passes through a hole 32 and positioning pins or bosses 36 fit into certain of the annular series of holes 34. The thumb-nut 38 tightens the curved member toward the face of cup 22 in any direction in which it may be set according to the positioning of the member on pins 36.

In Figure 1 the holder is shown mounted in its midposition on the clamp mount employed when the clamp is attached to an upright member. In Figure 3 the holder is secured on the after holes 32 of the series and on the clamp mount, employed when the clamp is secured to a generally horizontal member, as the seat of a boat or the like.

In operation, with the rod positioned as suggested in phantom in Figure 3, it will be seen that any pull or tug on the fishline trailed from the rod will cause the holder to rock on the spring of mount 19 and return in a very flexible manner. To remove the rod from the holder the fisherman lifts it from the fork 29 and twists it slightly to the left to permit disengagement of the handle end from under the hook 30.

Although we have shown and described certain specific embodiments of our invention, we are fully aware that modifications thereof are possible. Our invention, therefore, is not to be restricted except insofar as is necessitated by the prior art and by the spirit of the appended claims.

Having thus described our invention, we claim:

1. A rod-holder, comprising: a rod holding bracket adapted to position a rod, a clamp, a resilient element carried by said clamp and supporting a stud and a positioning pin adjacent thereto, said bracket having suitable openings for engagement with said stud and pin, and means for tightening said bracket to the flexible element.

2. A rod-holder, comprising: a rod holding bracket adapted to position a rod, a clamp, a coil spring carried by said clamp and supporting a stud and a positioning pin adjacent thereto, said bracket having suitable openings for engagement with said stud and pin, and means for tightening said bracket to the coil spring.

3. A rod-holder, comprising: a bracket adapted to position a rod and having a plurality of stud receiving holes therein each of which is surrounded by a plurality of annularly arranged positioning holes, a clamp supporting a coil spring, a plate secured on said spring and supporting a stud and a positioning pin adjacent to the stud, and means for tightening said bracket to said plate.

4. A rod-holder, comprising: a rod holding bracket adapted to position a rod, a clamp having a resiliently mounted stud upstanding thereon, said bracket being provided with an opening to accommodate said stud, positioning means between said bracket and the stud, and means for securing said bracket to said stud.

ROY L. JOHNSON.
FRANK E. BUYKEN.

REFERENCES CITED

The following references are of record in the file of this patent:

UNITED STATES PATENTS

| Number | Name | Date |
| --- | --- | --- |
| 521,355 | Yapp | June 12, 1894 |
| 1,525,515 | Socha | Feb. 10, 1925 |

FOREIGN PATENTS

| Number | Country | Date |
| --- | --- | --- |
| 628,806 | France | Apr. 18, 1932 |